United States Patent
Takahashi

(10) Patent No.: US 10,467,323 B2
(45) Date of Patent: Nov. 5, 2019

(54) PARAMETER UPDATE METHOD, PARAMETER UPDATE APPARATUS, AND NON-TRANSITORY RECORDING MEDIUM STORING PROGRAM FOR PARAMETER UPDATE

(71) Applicant: BROTHER KOGYO KABUSHIKI KAISHA, Nagoya-shi, Aichi-ken (JP)

(72) Inventor: Eisuke Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 543 days.

(21) Appl. No.: 15/279,981

(22) Filed: Sep. 29, 2016

(65) Prior Publication Data
US 2017/0090444 A1  Mar. 30, 2017

(30) Foreign Application Priority Data
Sep. 30, 2015 (JP) .................. 2015-194530

(51) Int. Cl.
*G06F 17/11* (2006.01)
*G05B 13/02* (2006.01)

(52) U.S. Cl.
CPC ............ *G06F 17/11* (2013.01); *G05B 13/024* (2013.01)

(58) Field of Classification Search
None
See application file for complete search history.

(56) References Cited

U.S. PATENT DOCUMENTS

| | | | | |
|---|---|---|---|---|
| 6,363,313 | B1* | 3/2002 | Katoh | F02D 41/02 701/104 |
| 6,381,504 | B1* | 4/2002 | Havener | G05B 13/048 700/28 |
| 2002/0019715 | A1 | 2/2002 | Cohen et al. | |
| 2002/0022903 | A1 | 2/2002 | Krah et al. | |
| 2005/0267608 | A1* | 12/2005 | Nishira | B60K 31/0008 700/44 |

FOREIGN PATENT DOCUMENTS

| | | |
|---|---|---|
| JP | H11-102203 A | 4/1999 |
| JP | 2002-116802 A | 4/2002 |
| JP | 2005-245051 A | 9/2005 |
| JP | 2006-227793 A | 8/2006 |
| JP | 2009-175917 A | 8/2009 |
| WO | 0062412 A1 | 10/2000 |

* cited by examiner

*Primary Examiner* — Ryan A Jarrett
(74) *Attorney, Agent, or Firm* — Scully, Scott, Murphy & Presser, PC

(57) ABSTRACT

There is provided a method of updating a setting value of a variable parameter, the method including: obtaining a time-series data of control input and a time-series data of control output observed in control with a controller; calculating a value of the variable parameter which minimizes an output value of an evaluation function based on the obtained time-series data of the control input and the control output; and updating the setting value of the variable parameter to the calculated value of the variable parameter. The evaluation function includes a first function part in which a first norm or a second norm changes depending on the value of the variable parameter, and a second function part of which specific frequency band has an amount, by which the output value of the evaluation function is increased, larger than that of any other frequency band.

7 Claims, 13 Drawing Sheets

PARAMETER UPDATE METHOD, PARAMETER UPDATE APPARATUS, AND NON-TRANSITORY RECORDING MEDIUM STORING PROGRAM FOR PARAMETER UPDATE

CROSS REFERENCE TO RELATED APPLICATION

The present application claims priority from Japanese Patent Application No. 2015-194530 filed on Sep. 30, 2015, the disclosure of which is incorporated herein by reference in its entirety.

BACKGROUND

Field of the Invention

The present disclosure relates to a parameter update method and a parameter update apparatus.

Description of the Related Art

As conventional automatic adjustment technologies for controllers, there are known the Fictitious Reference Iterative Tuning (FRIT) approach and the Virtual Reference Feedback Tuning (VRFT) approach. These technologies adjust a parameter of the controller so that the parameter approximates a target response.

SUMMARY

The conventional automatic adjustment technologies, unfortunately, merely adjust the parameter of the controller to obtain a control output corresponding to the target response, and thus a control system may become unstable. Namely, the automatic adjustment of the controller by the known automatic adjustment technology may destabilize the control system, thereby dispersing the response.

In view of the above, an object of the present disclosure is to provide a technology which is capable of adjusting a parameter of a controller while maintaining the stability of a control system.

According to an aspect of the present disclosure, a parameter update method relates to a method of updating a setting value of a variable parameter in a controller. The controller is configured to control a control target based on a control input, which is calculated according to a predetermined transfer function with the variable parameter based on a deviation between a control output and a target value of the control output.

The parameter update method according to the aspect of the present disclosure includes: obtaining time-series data of the control input and time-series data of the control output observed in control with the controller; calculating a value of the variable parameter which minimizes an output value of an evaluation function based on the obtained time-series data of the control input and the control output; and updating the setting value of the variable parameter in the controller to the calculated value of the variable parameter.

The evaluation function includes a first function and a second function. The first function may include the time-series data of the control input and the control output, the predetermined transfer function with the variable parameter, and a model function indicating a reference value of the control output corresponding to the target value.

As an example, the first function may be configured to output a norm of a difference between an observation value of the control output at each time identified from the time-series data and a reference value of the control output corresponding to the value of the variable parameter. Thus, the first function may be configured so that the norm of the difference changes depending on the value of the variable parameter. An inverse model of the predetermined transfer function can obtain a target value corresponding to an observation value of the control input. The reference value of the control output in the evaluation function may be an output value of a model function obtained by inputting the target value corresponding to the observation value of the control input to the above-described model function. Accordingly, the reference value of the control output may be configured to change depending on the value of the variable parameter.

As another example, the first function may be configured to output a norm of a difference between an observation value of the control input at each time identified from the time-series data and a reference value of the control input corresponding to the value of the variable parameter. Thus, the first function may be configured so that the norm of the difference changes depending on the value of the variable parameter. An inverse model of the model function can obtain a target value corresponding to an observation value of the control output. The reference value of the control input in the evaluation function may be a control input obtained by inputting, to the predetermined transfer function, a deviation between the observation value of the control output and a target value obtained from the inverse model of the model function. Thus, the reference value of the control input may be configured to change depending on the value of the variable parameter.

The second function may be a function in which the output value of the evaluation function corresponding to the norm of the difference increases as a change in the predetermined transfer function caused by a change in the value of the variable parameter is greater, and of which specific frequency band has an amount, by which the output value is increased, larger than that of any other frequency band.

According to the aspect of the present disclosure, since the evaluation function includes the second function, the value of the variable parameter which minimizes the output value of the evaluation function is calculated so as not to greatly change the characteristics of the transfer function. In particular, according to the aspect of the present disclosure, the value of the variable parameter which minimizes the output value of the evaluation function is calculated so as not to greatly change the characteristics of the transfer function in the specific frequency band.

Thus, the parameter update method of the present disclosure can adjust the variable parameter of the transfer function set in the controller in a range in which the characteristics of the frequency band, which is more likely to become unstable, are not changed greatly. In other words, the parameter update method of the present disclosure can adjust the variable parameter of the controller while maintaining the stability of the control system.

DESCRIPTION OF THE EMBODIMENTS

Hereinafter, an explanation will be made about embodiments of the present disclosure with reference to drawings. The following describes an example in which technologies related to a parameter update method and a parameter update apparatus of the present disclosure are applied to an image forming system which jets liquid droplets of ink on a sheet Q to form an image thereon. The technologies related to the present disclosure, however, are not limited to the application to the image forming system, and they can be applied to various systems.

First Embodiment

Figure 1:
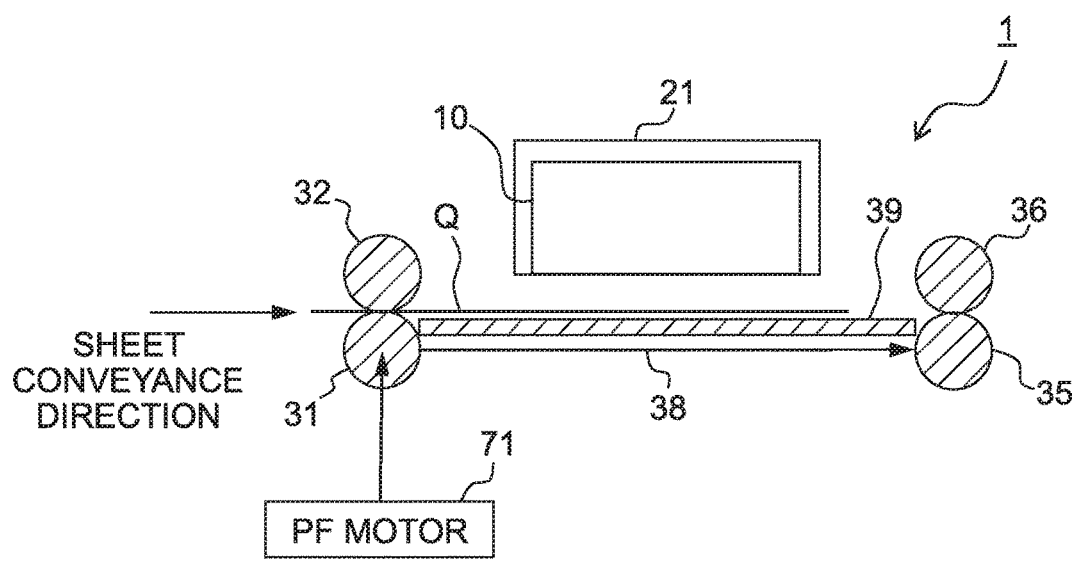
FIG. 1 is a schematic cross-sectional view of surroundings of a sheet conveyance mechanism in an image forming system.

An image forming system 1 depicted in FIG. 1 is formed as an ink-jet printer. The image forming system 1 includes a recording head 10 which jets liquid droplets of ink on the sheet Q to form an image thereon. The recording head 10 is carriage on a carriage 21. The carriage 21 reciprocates in a main scanning direction (the normal direction of a sheet surface of FIG. 1) perpendicular to a sheet conveyance direction to move the recording head 10 in the main scanning direction.

Similar to known ink-jet printers, the image forming system 1 intermittently conveys the sheet Q below the recording head 10 by a predetermined amount by repeatedly performing the conveyance control of the sheet Q in which the sheet Q is conveyed by the predetermined amount and then stopped. When the sheet Q is being stopped, the carriage 21 moves in the main scanning direction and the recording head 10 jets liquid droplets of ink. Accordingly, an image in the main scanning direction is formed on the sheet Q every time the sheet Q is conveyed intermittently. The image forming system 1 forms an image across the sheet Q by performing such an operation repeatedly.

The sheet Q is conveyed from the upstream to the downstream of the platen 39 positioned below the recording head 10 by receiving the action of force of a conveyance roller 31 and a discharge roller 35. The sheet conveyance direction is orthogonal to rotating shafts of the conveyance roller 31 and the discharge roller 35. The conveyance roller 31 is disposed upstream of the platen 39 to face a driven roller 32. The discharge roller 35 is disposed downstream of the platen 39 to face a driven roller 36.

The conveyance roller 31 is rotated by a PF motor 71 constructed of a direct-current motor (DC motor). Rotating the conveyance roller 31 in a state that the sheet Q is nipped between the conveyance roller 31 and the driven roller 32 conveys the sheet Q downstream. The discharge roller 35 is connected to the conveyance roller 31 via a connection mechanism 38. The discharge roller 35 rotates synchronously with the conveyance roller 31 by receiving the power from the PF motor 71 via the conveyance roller 31 and the connection mechanism 38. Rotating the discharge roller 35 in a state that the sheet Q is nipped between the discharge roller 35 and the driven roller 36 conveys the sheet Q, which is conveyed from the side of the conveyance roller 31 along the platen 39, further downstream. The conveyance roller 31, the driven roller 32, the discharge roller 35, the driven roller 36, the connection mechanism 38, and the platen 39 constitute a conveyance mechanism 30 (see FIG. 2) of the sheet Q.

Figure 2:
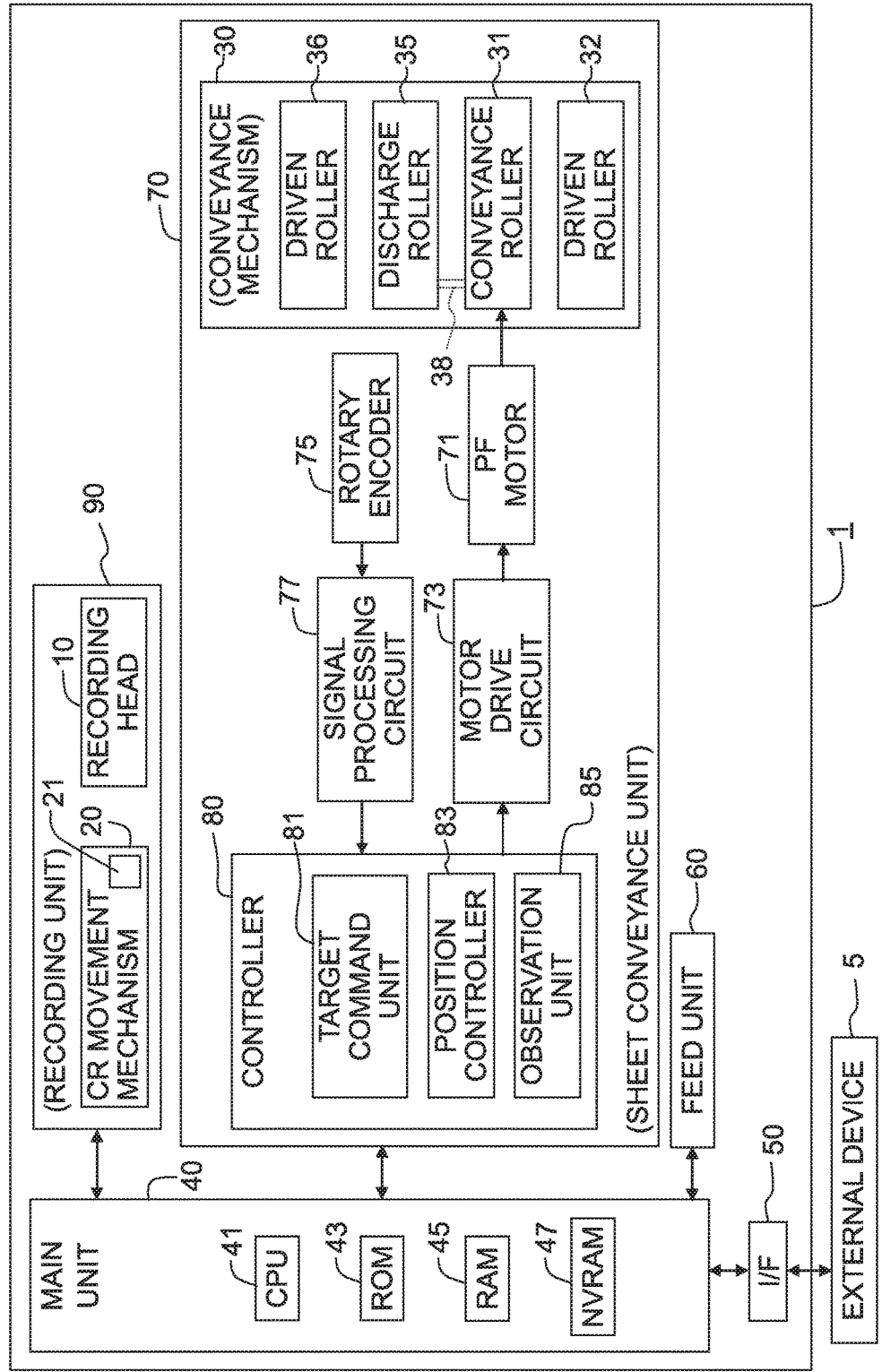
FIG. 2 is a block diagram of an electrical configuration of the image forming system.

As depicted in FIG. 2, the image forming system 1 of this embodiment includes a main unit 40, a communication interface 50, a feed unit 60, a sheet conveyance unit 70, and a recording unit 90. The main unit 40, which includes a CPU 41, a ROM 43, a RAM 45, and NVRAM 47, controls the image forming system 1 integrally. The CPU 41 executes processing according to programs stored in the ROM 43. The RAM 45 is used as a working memory when the CPU executes processing. The NVRAM 47 is an electrically data-rewritable nonvolatile memory, and it stores a data which is required to be maintained after the image forming system 1 is turned off.

When the main unit 40 receives a data to be printed from an external device 5 via the communication interface 50, the main unit 40 inputs commands to the feed unit 60, the sheet conveyance unit 70, and the recording unit 90 so as to form an image based on the data to be printed on the sheet Q.

The feed unit 60 conveys the sheet Q from an unillustrated feed tray to the nipping position of the sheet Q by use of the conveyance roller 31 and the driven roller 32 in accordance with the command from the main unit 40. The sheet conveyance unit 70 intermittently conveys the sheet Q supplied from the feed unit 60 to an image forming position below the recording head 10 in accordance with the command from the main unit 40.

When the sheet conveyance unit 70 stops the intermittent conveyance of the sheet Q, the recording unit 90 makes the recording head 10 jet liquid droplets of ink based on the data to be printed while moving the carriage 21 in the main scanning direction, according to the command from the main unit 40. This forms an image in the main scanning direction on the sheet Q. The recording unit 90 includes the recording head 10 and a carriage movement mechanism 20 which enables the carriage 21 carrying the recording head 10 to reciprocate in the main scanning direction.

Specifically, when the main unit 40 receives the data to be printed, the main unit 40 makes the feed unit 60 and the sheet conveyance unit 70 convey the leading edge of the sheet Q to the image forming position below the recording head 10, and then the main unit 40 makes the recording unit 90 move the carriage 21 (recording head 10) in the main scanning direction and perform the image forming operation for the sheet Q. After that, the main unit 40 sets a target locus r(t) during the intermittent conveyance on the sheet conveyance unit 70, and the main unit 40 makes the sheet conveyance unit 70 convey the sheet Q according to the target locus r(t) by a predetermined amount. Further, the main unit 40 makes the recording unit 90 perform the image forming operation for the sheet Q.

After the image forming operation, the main unit 40 makes the sheet conveyance unit 70 re-execute the conveyance operation of the sheet Q according to the target locus r(t). At the time of stoppage of the conveyance operation, the main unit 40 makes the recording unit 90 move the carriage 21 in the main scanning direction and re-execute the image forming operation for the sheet Q. The main unit 40 makes the sheet conveyance unit 70 and the recording unit 90 execute the processing alternatingly, thereby forming the image based on the data to be printed on the sheet Q.

More specifically, the sheet conveyance unit 70 includes the conveyance mechanism 30, the PF motor 71, a motor drive circuit 73, a rotary encoder 75, a signal processing circuit 77, and a controller 80. As described above, the conveyance mechanism 30 is a conveyance mechanism of the sheet Q including the conveyance roller 31, the driven roller 32, the discharge roller 35, the driven roller 36, the connection mechanism 38, and the platen 39. The conveyance mechanism 30 conveys the sheet Q by the rotations of the conveyance roller 31 and the discharge roller 35 upon receipt of the power from the PF motor 71.

The PF motor 71 is driven by the motor drive circuit 73 to rotate the conveyance roller 31. The motor drive circuit 73 drives the PF motor 71 by applying, to the PF motor 71, a drive current (or a drive voltage) corresponding to a control input u to be input from the controller 80.

The rotary encoder 75 is constructed similarly to known rotary encoders. The rotary encoder 75 outputs, as encoder signals, pulse signals of two-phases including an A-phase pulse signal and a B-phase pulse signal according to the rotation of the conveyance roller 31. The rotary encoder 75 is provided, for example, in a power transmission path between the PF motor 71 and the conveyance roller 31. The signal processing circuit 77 measures a rotation position y and a rotation velocity v of the conveyance roller 31 on the basis of each encoder signal to be input from the rotary encoder 75, and the signal processing circuit 77 inputs the measured rotation position y and rotation velocity v of the conveyance roller 31 to the controller 80.

The controller 80 includes a target command unit 81, a position controller 83, and an observation unit 85. The target command unit 81 inputs, to the position controller 83, a target value r of the rotation position y at each time t from a start point of control according to the target locus r(t) set by the main unit 40.

Figure 3:
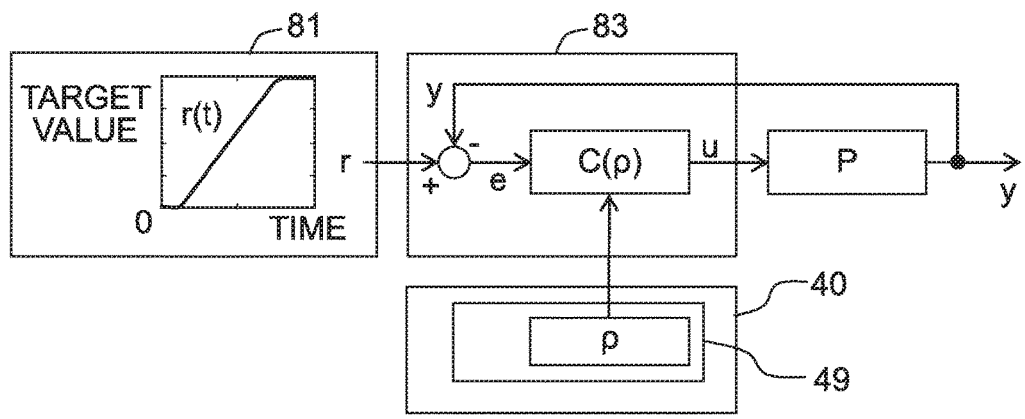
FIG. 3 is a block diagram depicting a position controller and a parameter update unit.

As depicted in FIG. 3, the position controller 83 inputs, to the motor drive circuit 73, a control input u corresponding to a deviation e=(r−y) between the target value r and the rotation position y obtained from the signal processing circuit 77. P indicated in FIG. 3 represents a transfer function P of a control target, and it satisfies a relational expression y=P·u. In particular, the position controller 83 converts the deviation e into the control input u according to a preset transfer function C(ρ) (u=C(ρ)·e). Through that operation, the position controller 83 feedback-controls the rotation position y with reference to the target value r.

The target locus r(t) which is set by the main unit 40 during the intermittent conveyance of the sheet Q represents a position locus along which the sheet Q is conveyed from a position at the start of control to a target stop position corresponding to the predetermined amount and the stoppage of the sheet Q is maintained. As an example, the target locus r(t) represents a locus by which a value corresponding to the position at the start of control (r=0) is monotonically increased to a value corresponding to the target stop position (r=$y_s$) and the target value r is maintained at the value r=$y_s$. As another example, the target locus r(t) may be a constant value r=$y_s$ corresponding to the target stop position. The position controller 83 drives and controls the PF motor 71 according to the target locus r(t), thereby rotating the conveyance roller 31 to convey the sheet Q by the predetermined amount.

The transfer function C(ρ) of the position controller 83 used in the calculation of the control input u has a variable parameter ρ set by the main unit 40, and the variable parameter ρ is adjusted by the main unit 40. The main unit 40 functions as a parameter update unit 49. Execution of the program by the CPU 41 makes the parameter update unit 49 update a setting value of the variable parameter ρ based on an observational data obtained from the observation unit 85.

The observation unit 85 collects, for a certain period, based on the command input from the main unit 40, a pair of the control input u as the control input which is observed when the position controller 83 controls the PF motor 71 based on the target locus r(t) and the rotation position y as the control output which is measured by the signal processing circuit 77, and the observation unit 85 provides, to the main unit 40, a time-series data of the control input u and a time-series data of the rotation position y as the observational data.

The main unit 40 updates the setting value of the variable parameter ρ based on the observation data. The main unit 40 functions as the parameter update unit 49 to update the setting value of the variable parameter ρ for the position controller 83 when a specified condition is satisfied, such as when the image forming system 1 is turned on. The updated setting value can be stored in the NVRAM 47.

Subsequently, an explanation will be made about a principle of update of the variable parameter ρ. The parameter update unit 49 of this embodiment calculates an appropriate value of the variable parameter ρ for the position controller 83 by calculating the value of the variable parameter ρ which minimizes the next evaluation function J1, and the parameter update unit 49 sets the calculated appropriate value in the position controller 83.

$$J1=\|Y-Y^*\|^2+\|G(\rho)\|^2 \qquad \text{Formula 5}$$

$$Y^*=T\cdot(C(\rho)^{-1}\cdot U+Y) \qquad \text{Formula 6}$$

As represented in the following formulas, Y included in the evaluation function J1 is a vectorial representation of the observation value (rotation position y) of the control output represented by the observational data, and U is a vectorial representation of the observation value (control input u) of the control input represented by the observational data. In the following, the observed rotation position y is also referred to as an observation value y of the control output and the observed control input u is also referred to as an observation value u of the control input.

$$Y=(y[1],y[2],\ldots,y[M])$$

$$U=(u[1],u[2],\ldots,u[M])$$

A component y[k] (1≤k≤M) of Y and a component u[k] (1≤k≤M) of U correspond to the control output and the control input observed at each time, respectively. Each of y[k] and u[k] is sequenced in the corresponding one of the vectors Y, U in the order of time. In other words, y[k] and u[k] are "time series data".

T included in the evaluation function J1 is a model function representing a reference value $Y_d$ of the control output (rotation position y) corresponding to the target value r. Namely, the model function T is a transfer function in which the reference value $Y_d$ is represented by a relational expression $Y_d = T \cdot r$. A first member of the evaluation function J1 corresponds to a norm of the difference between a vectorial representation Y of the observation value y and a vectorial representation Y* of the reference value $Y_d$. Here, the L2 norm is adopted as the norm.

The first member of the evaluation function J1 is an evaluation function following the known FRIT approach. Adjusting the variable parameter ρ changes the observation value y. Here, it is troublesome to provide the observation value y for each value of the variable parameter ρ for searching the variable parameter ρ in which the norm of the difference between the vectorial representation Y of the observation value y and the vectorial representation Y* of the reference value $Y_d$ is minimum. In the FRIT approach, by converting the reference value $Y_d = T \cdot r$ of the control output to a reference value $T \cdot r^*(\rho)$ of the control output according to the variable parameter ρ, the variable parameter ρ in which the norm of the difference between the vectorial representation Y of the observation value y and the vectorial representation Y* of the reference value $Y_d$ is minimum can be searched by using the observation value y independent of the variable parameter ρ. $r^*(\rho)$ is a pseudo-target value corresponding to the target value r which satisfies a relational expression $r^*(\rho) = C^{-1}(\rho) \cdot u + y$.

Figure 4:
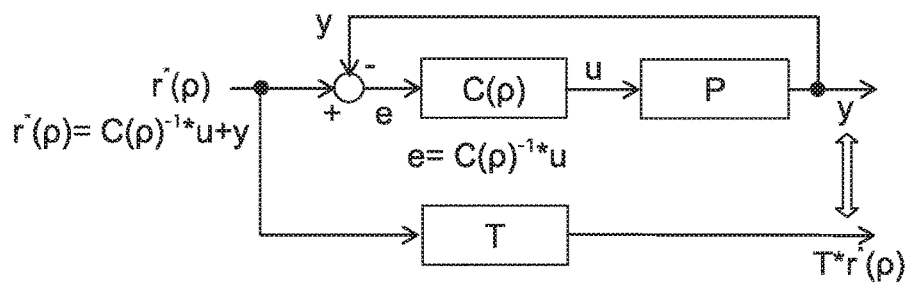
FIG. 4 is an illustrative diagram of the FRIT approach.

Inputting the pseudo-target value $r^*(\rho)$ into the position controller 83 obtains the observation value y of the control output represented by the observational data, as understood from FIG. 4. The reference value $T \cdot r^*(\rho)$ of the control output according to the variable parameter ρ is obtained by inputting the pseudo-target value $r^*(\rho)$ into the model function T.

Specifically, the first member of the evaluation function J1 corresponds to a norm of the difference between a vectorial representation Y of the observation value y and a vectorial representation Y* of the reference value $T \cdot r^*(\rho)$ of the control output according to the variable parameter ρ. In other words, the first member of the evaluation function J1 corresponds to a norm of the difference between the observation value y of the control output at each time and a reference value $T \cdot (C^{-1}(\rho) \cdot u + y)$ of the control output corresponding to the value of the variable parameter ρ. The value of the variable parameter ρ which minimizes the first member of the evaluation function J1 corresponds to a value of the variable parameter ρ by which the reference value $Y_d = T \cdot r$ is observed as the control output corresponding to the target value r.

In the conventional FRIT approach, the variable parameter ρ is searched without consideration of the stability of a control system. Thus, according to the knowledge of the inventor of the present disclosure, applying the FRIT approach to the control system with a high-order complex transfer function C(ρ) makes the control system unstable.

A second member of the evaluation function J1 adopted in this embodiment is provided to prevent the control system from becoming unstable. A function G(ρ) provided for the second member of the evaluation function J1 increases the norm $\|G(\rho)\|$ as the change in the transfer function C(ρ) caused by the change in the value of the variable parameter ρ is greater, and a specific frequency band of the function G(ρ) has an amount, by which the norm $\|G(\rho)\|$ is increased, larger than those of other frequency bands. The specific frequency band is a frequency band in which the adjustment of the variable parameter ρ is more likely to destabilize the control system. The band in which the control system is more likely to be destabilized is specified by examining the open-loop characteristics of the control system, as is well known in the art.

In this embodiment, the function G(ρ) is defined by a function $F(\rho) \cdot W$ ($G(\rho) = F(\rho) \cdot W$). Here, a weighing vector W can be defined by representing, in a vectorial representation similar to Y and U, a time-series data of a signal with frequency components most of which are in the specific frequency band. The signal with frequency components most of which are in the specific frequency band is generated, for example, by inputting a white noise signal to a filter having the specific frequency band as a passband and other frequency bands as stopbands. As is well known in the art, the white noise signal is a signal with components which are uniformly distributed in all frequency bands, that is, a signal with a flat frequency spectrum. The weighing vector W is represented, for example, by the following formula by use of a transfer function H of the filter and a value w [k] of the white noise signal at each time (1≤k≤M).

$$W = H \cdot (w[1], w[2], \ldots, w[M])$$

The function F(ρ) includes, as elements, an initial transfer function $Cn = (\rho_{ini})$ which is obtained by assigning an initial value $\rho_{ini}$ of the variable parameter ρ to the transfer function C(ρ) and the transfer function C(ρ) with the variable parameter ρ. In the function F(ρ), the norm increases as the ratio or difference between the transfer function C(ρ) and the initial transfer function Cn is greater. The initial value $\rho_{ini}$ of the variable parameter ρ may be a factory value of the variable parameter ρ which is not updated by the parameter update unit 49. In particular, the function F(ρ) may be any one of the following functions: F1(ρ), F2(ρ), F3(ρ), and F4(ρ) or a combination thereof.

$$F1(\rho) = \left(1 - \frac{Cn}{C(\rho)}\right) \quad \text{Formula 7}$$

$$F2(\rho) = \left(1 - \frac{C(\rho)}{Cn}\right) \quad \text{Formula 8}$$

$$F3(\rho) = C(\rho) - Cn \quad \text{Formula 9}$$

$$F4(\rho) = Cn - C(\rho) \quad \text{Formula 10}$$

When explained in a general way, in the function F(ρ), the norm of the function F(ρ) may indicate a minimum value (e.g., zero) when C(ρ)=Cn is satisfied in a variation range of the variable parameter ρ, and the norm of the function F(ρ) may indicate a value greater than the minimum value when C(ρ)=Cn is not satisfied in the variation range of the variable parameter ρ. It is preferred that the function F(ρ) have no minimum point except for a point indicating the minimum value in the variation range of the variable parameter ρ.

The following describes, for ease of explanation, an example in which the function F1(ρ) is used as the function F(ρ) of this embodiment and $\|F1(\rho) \cdot W\|^2$ is set as the second member of the evaluation function J1. The evaluation function J1 of this example is represented by the following formula.

$$J1 = \|Y - T \cdot (C(\rho)^{-1} \cdot U + Y)\|^2 + \left\|\left(1 - \frac{Cn}{C(\rho)}\right) \cdot W\right\|^2 \quad \text{Formula 11}$$

As described above, the evaluation function J1 includes, as elements, the observation values Y, U of the control input and the control output, the model function T, the transfer function C(ρ) of the controller (position controller 83), and the weighing vector W. Of the elements, a designer is able to determine the transfer function C(ρ) of the controller and the model function T according to a targeted control response (T·r).

It is preferred that the designer set the variable parameter ρ of the transfer function C(ρ) by arranging the variable parameter ρ in the numerator of C(ρ)$^{-1}$ and by not arranging the variable parameter ρ in the denominator of C(ρ)$^{-1}$. The reason thereof is that a least-square approach which is widely used to solve a minimization problem can not be adopted when the variable parameter ρ is arranged in the denominator of the evaluation function J1. In this embodiment, the variable parameter ρ is indicated by a single symbol. The variable parameter ρ, however, may be a set of variable parameters $\rho_1, \rho_2, \ldots \rho_N$.

For example, assuming that the transfer function C is defined by the following formula by use of coefficients $A_0$, $A_1$, $A_2$, $A_3$, $A_4$, $A_5$, $A_6$ and coefficients $B_1$, $B_2$, $B_3$, $B_4$, $B_5$, $B_6$. In the following formula, s is a Laplace operator.

$$C = \frac{A_6 s^6 + A_5 s^5 + A_4 s^4 + A_3 s^3 + A_2 s^2 + A_1 s^1 + A_0}{B_6 s^6 + B_5 s^5 + B_4 s^4 + B_3 s^3 + B_2 s^2 + B_1 s^1} \quad \text{Formula 12}$$

In that case, the transfer function C(ρ) can be defined by setting the coefficients $B_1, B_2, B_3, B_4, B_5, B_6$ to the variable parameter $\rho = \{\rho_1, \rho_2, \rho_3, \rho_4, \rho_5, \rho_6\}$.

$$C(\rho) = \frac{A_6 s^6 + A_5 s^5 + A_4 s^4 + A_3 s^3 + A_2 s^2 + A_1 s^1 + A_0}{\rho_6 s^6 + \rho_5 s^5 + \rho_4 s^4 + \rho_3 s^3 + \rho_2 s^2 + \rho_1 s^1} \quad \text{Formula 13}$$

Figure 5:
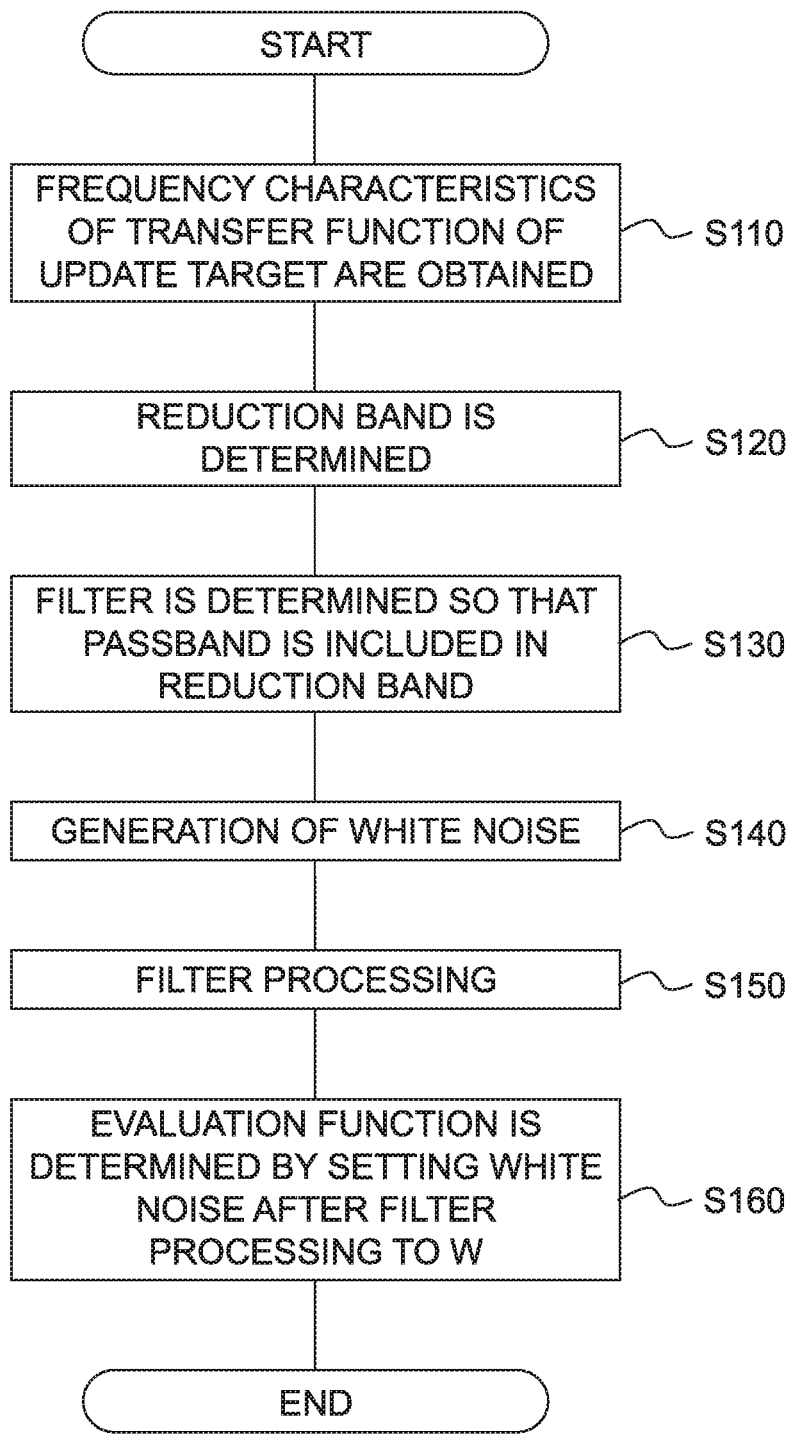
FIG. 5 is a flowchart indicating a method of setting an evaluation function.

After determining the transfer function C(ρ), the initial value $\rho = \rho_{ini}$, and the model function T, the designer designs the weighing vector W and sets it in the evaluation function J1 in accordance with a design procedure in FIG. 5. The evaluation function J1 to be used in the parameter update unit 49 is determined, accordingly.

At first, the designer can obtain a frequency characteristic diagram of the transfer function C(ρ) which is an update (tuning) target of the variable parameter ρ (S110). In particular, the designer can obtain a Bode diagram. Then, the frequency band, which is more likely to become unstable by the adjustment of the variable parameter ρ and in which the change in frequency characteristics by the adjustment should be reduced, is determined by comparing a gain and a phase in the frequency characteristic diagram (S120). In the following, the above frequency band is referred to as a reduction band.

According to the known determination method, the transfer function C(ρ) is stable provided that, in a Bode diagram showing the open-loop characteristics, the value of the gain obtained when the phase passes −180 degrees is lower than 0 dB and the value of the phase obtained when the gain passes 0 dB is smaller than −180 degrees.

Figure 6:
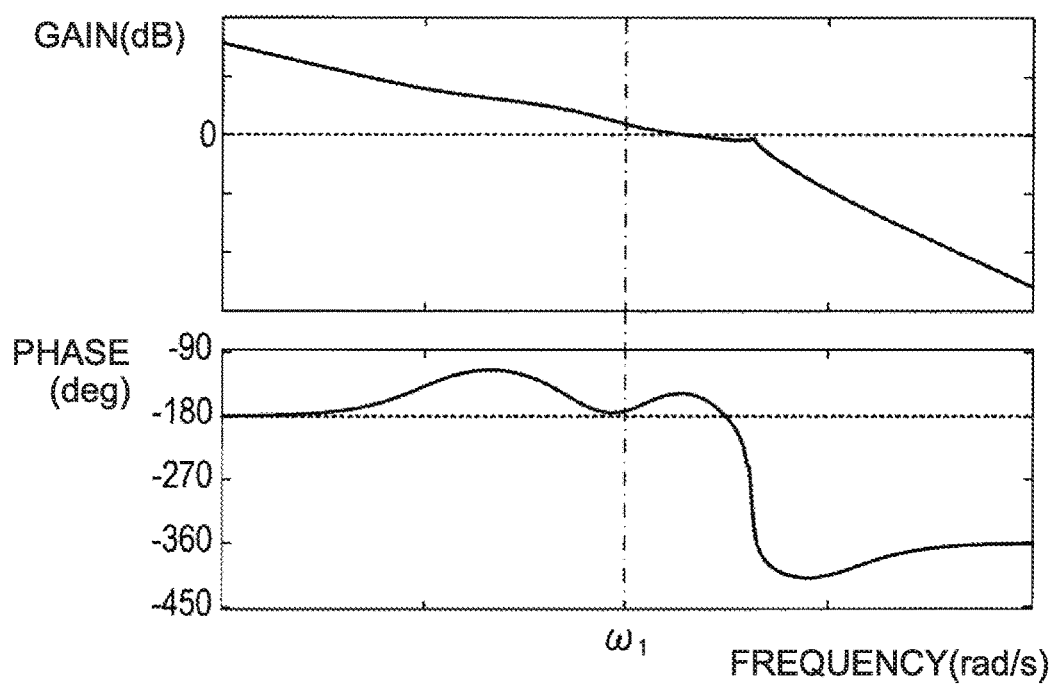
FIG. 6 is a Bode diagram of a transfer function to be mounted on a controller.

Assuming that the initial transfer function Cn=C($\rho_{ini}$) has the frequency characteristics following the Bode diagram depicted in FIG. 6. The Bode diagram depicted in FIG. 6 relates to a transfer function Cn which is obtained by assigning the initial value $\rho = \rho_{ini}$ to the transfer function C(ρ) defined by the formula 13. In that case, the phase value is close to −180 degrees in a state that the frequency is close to a value $\omega_1$. Thus, it can be judged that the change in frequency characteristics by the adjustment of the variable parameter ρ should be reduced in a band with the value $\omega_1$ or more. Namely, it can be judged that the reduction band is the band with the value $\omega_1$ or more.

The designer can determine a filter which has the reduction band as the passband, as a filter to be used for generation of the weighing vector W, according to the judgement result in S120 (S130). When it is judged that the reduction band is the frequency band with the value $\omega_1$ or more, for example, a cutoff frequency can be set as the value $\omega_1$ and a highpass filter which has the band with the value $\omega_1$ or more as the passband can be determined as the filter to be used for generating the weighing vector W. The transfer function H of the highpass filter can be represented, for example, by the following formula. A value $\omega_c$ corresponds to the cutoff frequency.

$$H = \left(\frac{s}{s + \omega_c}\right)^{10} \quad \text{Formula 14}$$

Then, the designer generates the white noise signal through software processing by a device or computer (S140) and inputs the white noise signal to a filter in which the passband is in the reduction band determined in S130 and the stopband is on the outside of the reduction band, thereby producing a time-series data of the white noise signal after passing through the filter (S150). The designer can determine the signal intensity of the white noise signal experimentally so that the second member of the evaluation function J1 has a greater influence on the evaluation function J1 than the first member.

Figure 7:
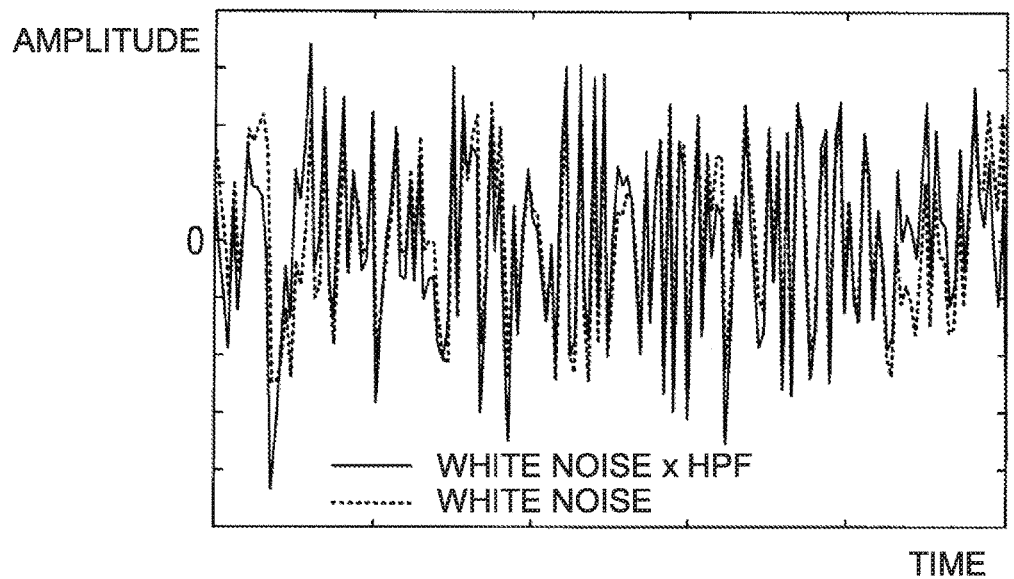
FIG. 7 is a diagram indicating a white-noise signal before and after a filter process.
Figure 8:
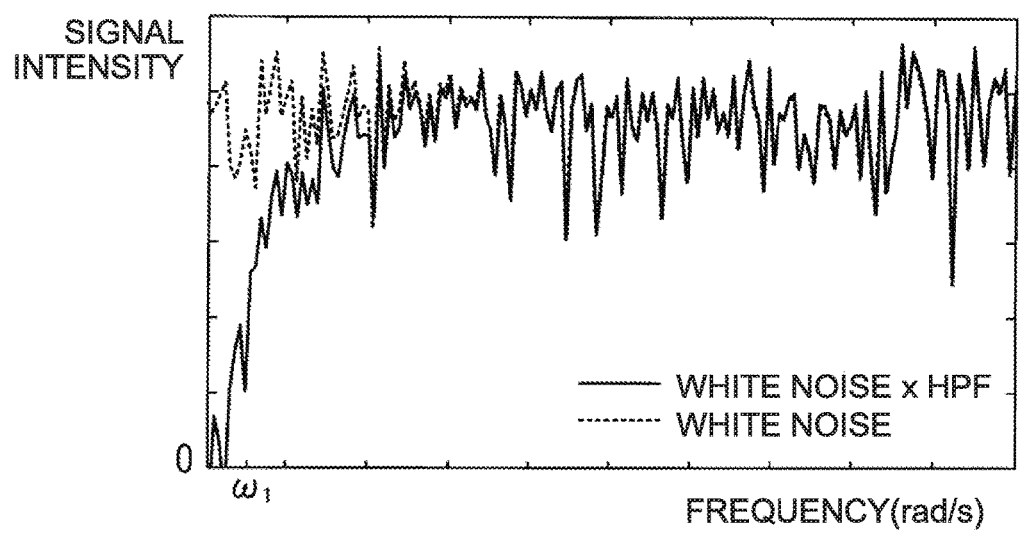
FIG. 8 is a diagram indicating a frequency spectrum of the white-noise signal before and after the filter process.

In FIG. 7, the white noise signal after passing the highpass filter is depicted by a solid line and the white noise signal before passing the highpass filter is depicted by a broken line. In FIG. 8, a frequency spectrum of the white noise signal after passing the highpass filter is depicted by a solid line and the white noise signal before passing the highpass filter is depicted by a broken line. As understood from FIG. 8, the white noise signal after passing the highpass filter indicates a weak signal intensity in the frequency band with less than the value $\omega_1$, and it has frequency components most of which are in the frequency band (the reduction band) with not less than the value $\omega_1$.

The designer can define the evaluation function J1 by setting a vectorial representation H*(w[1], w[2], . . . , w[M]) of the time-series data produced in S150 as the weighing vector W (S160). The weighing vector W can be defined as a M-dimensional vector having the same number of elements as Y, U. The defined evaluation function J1 can be incorporated in a program which makes the main unit 40 work as the parameter update unit 49, as a function with variables Y, U, ρ.

Figure 9:
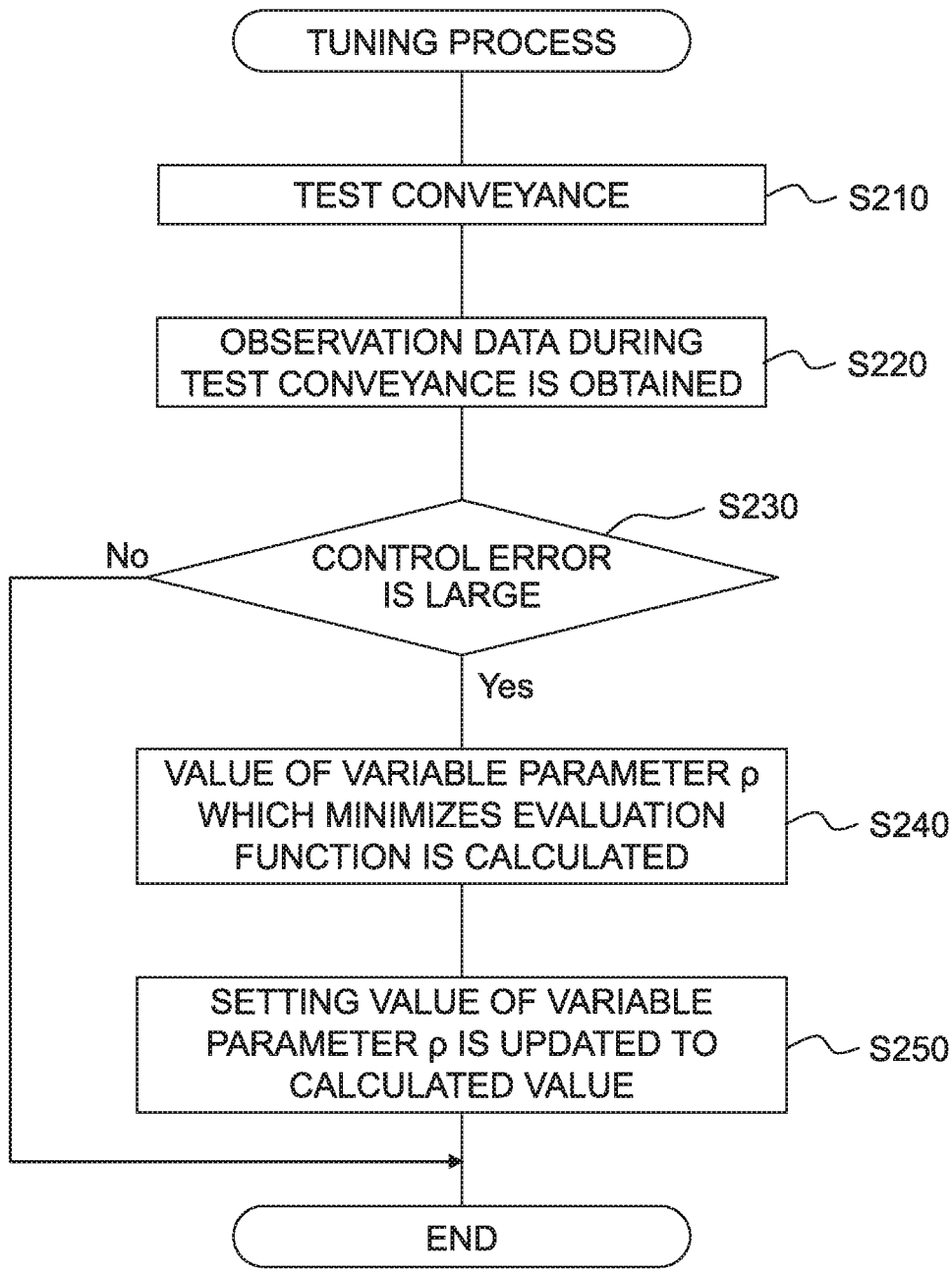
FIG. 9 is a flowchart indicating a tuning process to be executed by a main unit (parameter update unit).

The program which makes the main unit 40 work as the parameter update unit 49 can be designed as a program which makes the main unit 40 execute a tuning process depicted in FIG. 9. As an example, the main unit 40 can execute the tuning process depicted in FIG. 9 regularly or every time the image forming system 1 is turned on. Executing the tuning process regularly includes, for example, execution of the tuning process every time the number of sheets printed exceeds a predetermined amount and execution of the tuning process every time a given time elapses. As another example, the main unit 40 can execute the tuning process depicted in FIG. 9 every time a user inputs an execution command. The user can input the execution command through the external device 5 or a user interface (not depicted) provided in the image forming system 1.

When starting the tuning process, the main unit 40 inputs a command to the sheet conveyance unit 70 so that the sheet conveyance unit 70 performs test conveyance of the sheet Q (S210). The main unit 40 sets the target locus r(t) in the controller 80 and makes the position controller 83 execute the control of the PF motor 71 based on the target locus r(t) and the transfer function C(ρ). The main unit 40 stores the setting value of the variable parameter ρ in the NVRAM 47 and sets the setting value in the position controller 83. Before performing the test conveyance, the main unit 40 can input a command to the feed unit 60 so that the feed unit 60 supplies the sheet Q to the conveyance mechanism 30.

The observation unit 85 operates according to the command input from the main unit 40, collects a pair of a control input u, which is observed when the position controller 83 controls the PF motor 71 based on the target locus r(t) during the test conveyance, and a rotation position y measured by the signal processing circuit 77, and provides, to the main unit 40, a time-series data of the pair of the control input u and the rotation position y, as the observational data.

The main unit 40 obtains the observation data provided from the observation unit 85 (S220). Then, the main unit 40 determines whether or not a control error is large based on the observation data (S230). The main unit 40 determines, based on the observation data, whether or not the observation value y in a steady-state in which the target value r(t) reaches the value $r=y_s$ corresponding to the target stop position and $r=y_s$ is maintained, is within a predetermined acceptable range (see FIG. 10B) on the basis of the target stop position. The main unit 40 determines whether the control error is large, accordingly.

The position controller 83 continues to calculate the control input u based on e=r−y after the target value r(t) reaches $r=y_s$. Thus, at first it seems that the operation of the position controller 83 adjusts the conveyance roller 31 and the position of the sheet Q to the target stop position. But in fact, when the conveyance roller 31 and the sheet Q are stopped once, the load acting on the conveyance roller 31, such as static frictional force, increases. The sheet Q will not move unless drive force overcoming the increased load acts on the conveyance roller 31. This keeps the sheet Q stopped, even when the sheet Q is not in the target stop position.

Figure 10A:
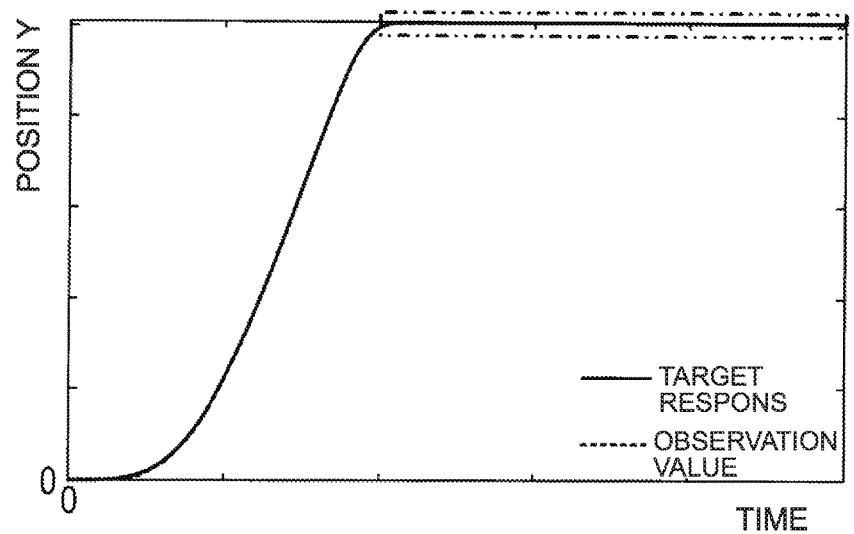
FIG. 10A is a graph indicating an observation value and a target response of a control output.
Figure 10B:
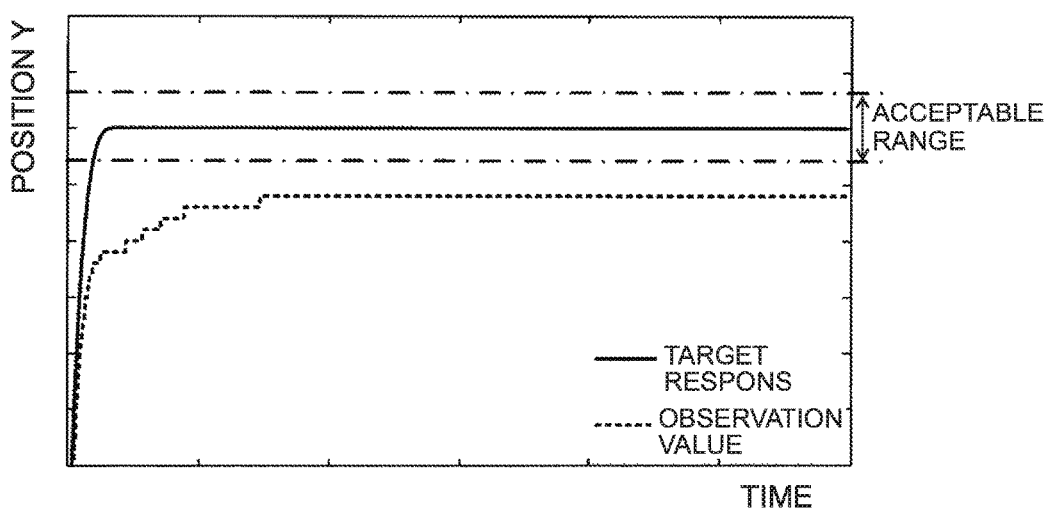
FIG. 10B is a partial enlarged diagram of FIG. 10A.

When the observation value y is not within the acceptable range, the main unit 40 determines that the control error is large. Other than that, the main unit 40 determines that the control error is small. In FIG. 10A, a locus of the observation value y obtained when the control error is large is depicted by a broken line, and the target response (T·r) is depicted by a solid line. FIG. 10B is a partial enlarged diagram of FIG. 10A (an area surrounded by a two-dot chain line in FIG. 10A). The model function T corresponding to the target response indicated in FIG. 10B is as follows.

$$T = \left(\frac{10^4}{s+10^4}\right)^4 \quad \text{Formula 15}$$

According to FIG. 10B, the observation value y in the steady-state is not within the acceptable range of which center is the target response (T·t). In that case, the main unit 40 determines that the control error is large (S230: Yes).

When the main unit 40 determines that the control error is large, the process proceeds to S240. When the main unit 40 determines that the control error is small (S230: No), the main unit 40 judges that the variable parameter ρ requires no update, completing the tuning process.

In S240, the main unit 40 assigns the observation value u of control input and the observation value y of control output indicated by the observation data obtained in S220 to the evaluation function J1, and calculates the value of the variable parameter ρ which minimizes the evaluation function J1 after the assignment. In particular, the value of the variable parameter ρ which minimizes the evaluation function J1 is calculated based on the least-square approach.

After that, the main unit 40 sets the calculated value of the variable parameter ρ in the position controller 83 (S250), thereby updating the setting value of the variable parameter ρ in the position controller 83. Further, the calculated value of the variable parameter ρ is stored, as the setting value of the variable parameter ρ, in the NVRAM 47, and then the tuning process is completed.

Figure 11:
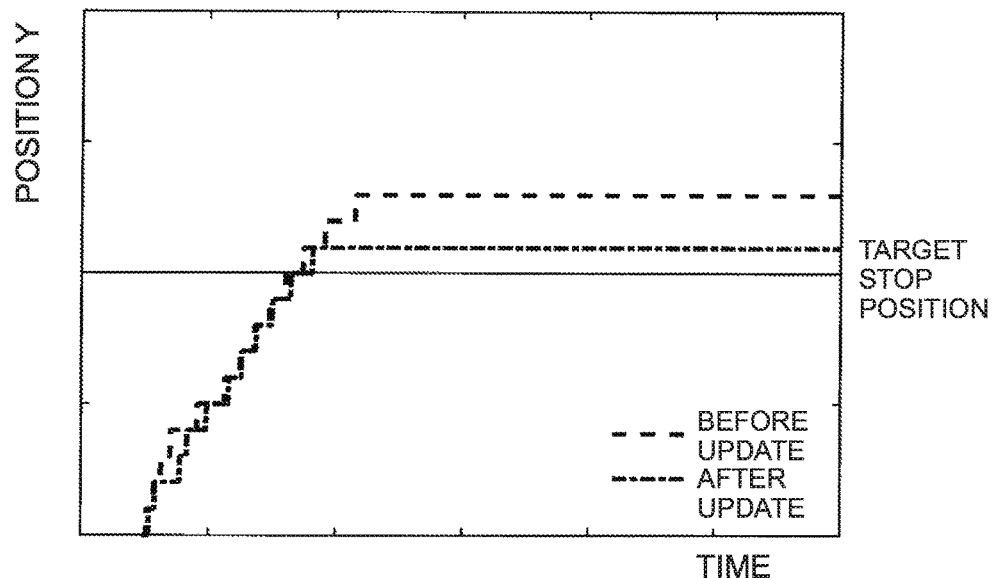
FIG. 11 is a graph indicating observation values of the control output before and after a parameter update according to a first embodiment.

FIG. 11, FIG. 12, and FIGS. 13A to 13C show parameter update results using the transfer function C(ρ) represented by the formula 13 and the model function T represented by the formula 15. FIG. 11 depicts, similar to FIG. 10B, a locus of the observation value y in the steady-state. In FIG. 11, the observation value y before the variable parameter ρ is updated by the parameter update unit 49 is depicted by a broken line, and the observation value y after the variable parameter ρ is updated by the parameter update unit 49 is depicted by a chain line. In FIG. 11, the target stop position is depicted by a solid line. As understood from FIG. 11, the control accuracy by the position controller 83 is improved by the update of the variable parameter ρ with the parameter update unit 49.

Figure 12:
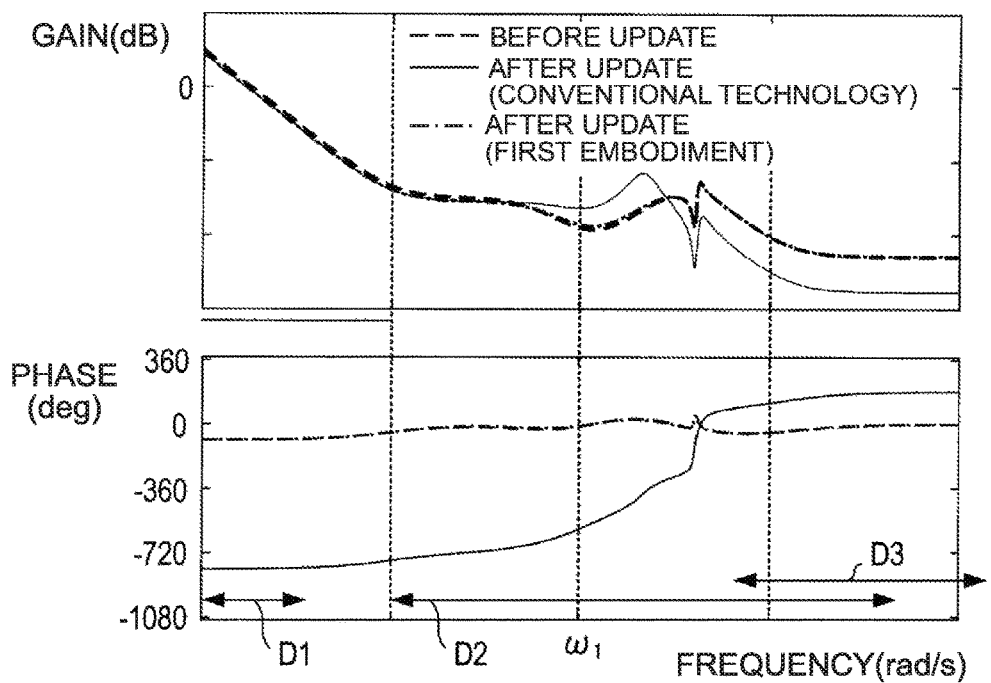
FIG. 12 is a Bode diagram indicating frequency characteristics of the transfer function before and after the parameter update according to the first embodiment.

As understood from FIG. 12, the transfer function C(ρ) is updated so that the effect of the second member of the evaluation function J1 does not destabilize the control system. In FIG. 12, the frequency characteristics of the transfer function C(ρ) before the variable parameter ρ is updated are depicted by a broken line, the frequency characteristics after the variable parameter ρ is updated according to the evaluation function J1 are depicted by a chain line, and the frequency characteristics after the variable parameter ρ is updated according to a conventional evaluation function are depicted by a solid line. The conventional evaluation function is a function in which the second member is removed from the evaluation function J1.

Figure 13A:
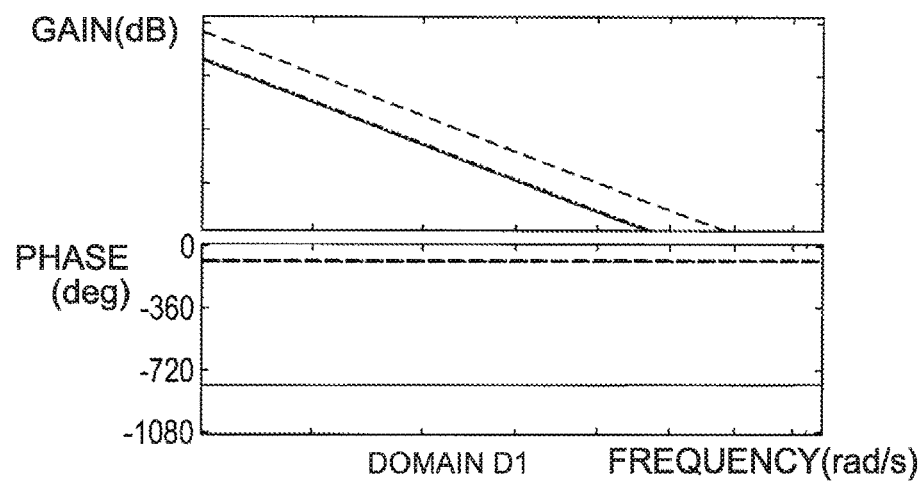
FIGS. 13A to 13C are partial enlarged diagrams of FIG. 12.
Figure 13B:
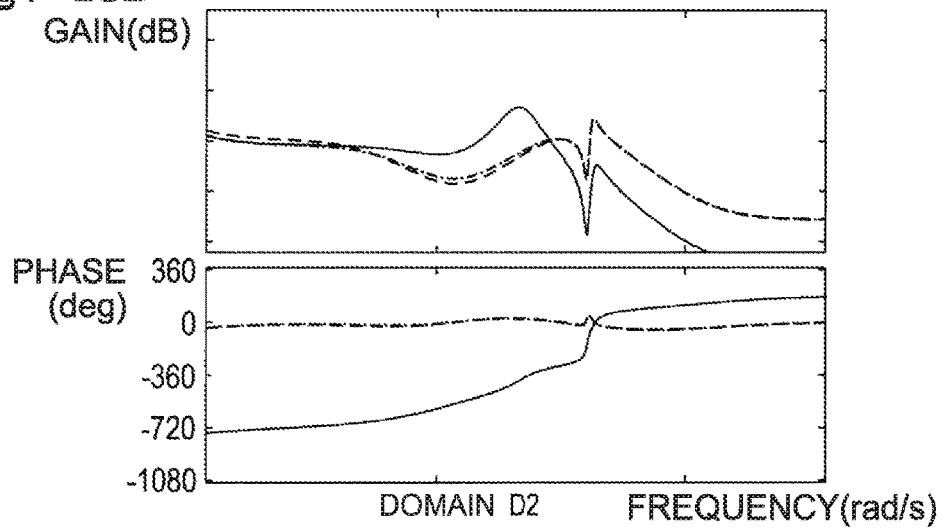
Figure 13C:
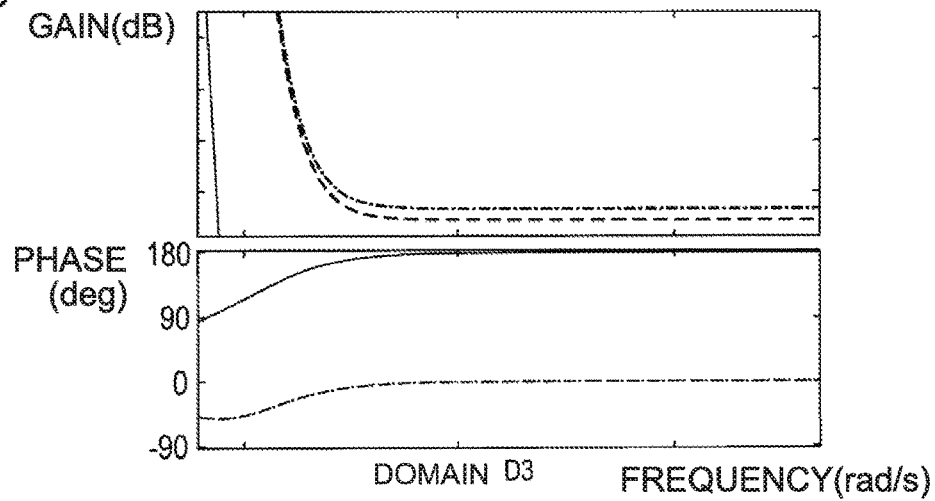

As understood from FIG. 12 and FIGS. 13A to 13C showing enlarged parts of FIG. 12, the frequency characteristics of the transfer function C(ρ) updated by the conventional evaluation function show that the phase is below −180 degrees in a state that the gain is 0 dB. This means that the control system is unstable. FIG. 13A is an enlarged view of the frequency domain D1 of FIG. 12, FIG. 13B is an enlarged view of the frequency domain D2 of FIG. 12, and FIG. 13C is an enlarged view of the frequency domain D3 of FIG. 12. Meanwhile, in this embodiment, the variable parameter ρ is updated appropriately without destabilizing the control system. Namely, in this embodiment, the variable parameter ρ is updated while achieving both the stability and the control performance.

In this embodiment, even when the characteristics of the control target (transfer function P) change over time, the variable parameter ρ of the position controller 83 is appropriately adjusted according to the change with the passage of time, so that the position controller 83 is updated to achieve the target response. Thus, the image forming system 1 maintains the quality of an image to be formed on the sheet Q at a high level.

Second Embodiment

An explanation will be made about the image forming system 1 according to the second embodiment. The image forming system 1 of the second embodiment is formed similarly to the image forming system 1 of the first embodiment, except that the evaluation function used in the parameter update unit 49 of the first embodiment is changed from the evaluation function J1 to an evaluation function J2 on the basis of the VRFT approach. Thus, the following selectively describes the configuration related to the evaluation function J2.

The parameter update unit 49 of this embodiment calculates an appropriate value of the variable parameter ρ for the position controller 83 by calculating the value of the variable parameter ρ which minimizes the next evaluation function J2, and sets the calculated value in the position controller 83.

$$J2=\|U-U^*\|^2+\|G(\rho)\|^2 \qquad \text{Formula 16}$$

$$U^*=C(\rho)\cdot(T^{-1}\cdot Y-Y) \qquad \text{Formula 17}$$

Y, U included in the evaluation function J2 are similar to Y, U included in the evaluation function J1. T included in the evaluation function J2 is a model function representing a reference value $Y_d$ of the control output (rotation position y) corresponding to a target value r, similar to the evaluation function J1. The reference value $Y_d$ is represented by the relational expression $Y_d=T\cdot r$.

Figure 14:
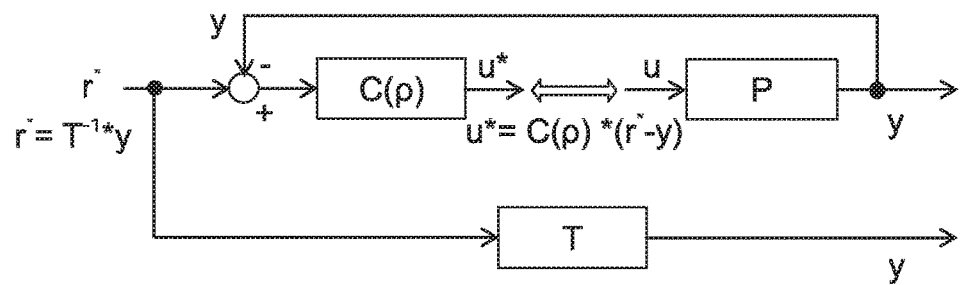
FIG. 14 is an illustrative diagram of the VRFT approach.

A first member of the evaluation function J2 is an evaluation function following the known VRFT approach. According to the VRFT approach, as depicted in FIG. 14, a value $T^{-1}\cdot y$, which is obtained by inputting an observation value y in an inverse model $T^{-1}$ of the model function T, is used as a pseudo-target value r*. A control input $u^*=C(\rho)\cdot(T^{-1}\cdot y-y)$, which is obtained by inputting the target value r* in the controller (position controller 83), is used as a reference value of control input, and the variable parameter ρ is updated to reduce the difference between the reference value of control input and an observation value u of control input.

The first member of the evaluation function J2 corresponds to a norm of the difference between a vectorial representation U of the observation value u of control input and a vectorial representation U* of a reference value $u=C(\rho)\cdot(T^{-1}\cdot y-y)$ of control input according to the variable parameter ρ. In other words, the first member of the evaluation function J2 corresponds to a norm of the difference between the observation value u of control input at each time and the reference value $u^*=C(\rho)\cdot(T^{-1}\cdot y-y)$ of control input corresponding to the value of the variable parameter ρ. Thus, similar to the evaluation function J1, the value of the variable parameter ρ which minimizes the first member of the evaluation function J2 corresponds to the value of the variable parameter ρ by which the reference value $Y_d=T\cdot r$ of control output indicated by the model function is observed as the control output corresponding to the target value r.

In the second embodiment, the evaluation function J2 is defined by adding the second member $\|G(\rho)\|$ which is similar to the first embodiment to the evaluation function following the VRFT approach. As described in the first embodiment, the function G(ρ) provided for the second member of the evaluation function J2 increases a norm $\|G(\rho)\|$ as the change in the transfer function C(ρ) caused by the change in the value of the variable parameter ρ is greater. In the function G(ρ), its specific frequency band has an amount, by which the norm $\|G(\rho)\|$ is increased, larger than those of other frequency bands. Similar to the first embodiment, the specific frequency band corresponds to the reduction band, and the adjustment of the variable parameter ρ is more likely to destabilize the control system in the specific frequency band. In particular, the evaluation function J2 is defined by the following formula.

$$J2=\|U-U^*\|^2+\|F(\rho)\cdot W\|^2 \qquad \text{Formula 18}$$

The function F(ρ) can be defined similarly to the first embodiment. The weighing vector W can be set according to FIG. 5. The parameter update unit 49 can calculate the variable parameter ρ which minimizes the evaluation function J2 by using the evaluation function J2 in S240, and then set the calculated value in the position controller 83.

When the variable parameter ρ which minimizes the evaluation function J2 is calculated by using the least-square approach, the variable parameter ρ is required to be arranged in the numerator of the evaluation function J2, similar to the evaluation function J1. Although the evaluation function J1 includes the transfer function C(ρ) as the inverse model $C^{-1}(\rho)$, the same is not true of the evaluation function J2. Thus, in the second embodiment, the transfer function C(ρ) can be defined by setting the variable parameter ρ in the numerator of the transfer function C. For example, in the transfer function C indicated in the formula 12, the transfer function C(ρ) can be defined by setting coefficients $A_0, A_1, A_2, A_3, A_4, A_5, A_6$ in the variable parameter $\rho=\{\rho_0, \rho_1, \rho_2, \rho_3, \rho_4, \rho_5, \rho_6\}$, as represented by the following formula.

$$C(\rho) = \frac{\rho_6 s^6 + \rho_5 s^5 + \rho_4 s^4 + \rho_3 s^3 + \rho_2 s^2 + \rho_1 s^1 + \rho_0}{B_6 s^6 + B_5 s^5 + B_4 s^4 + B_3 s^3 + B_2 s^2 + B_1 s^1} \qquad \text{Formula 19}$$

FIG. 15, FIG. 16, FIG. 17A, and FIG. 17B show update results of the variable parameter ρ which are obtained by using the transfer function C(ρ) and the next evaluation function J2.

$$J2 = \|U - U^*\|^2 + \left\|\left(1 - \frac{C(\rho)}{Cn}\right)\cdot W\right\|^2 \qquad \text{Formula 20}$$

Figure 15:
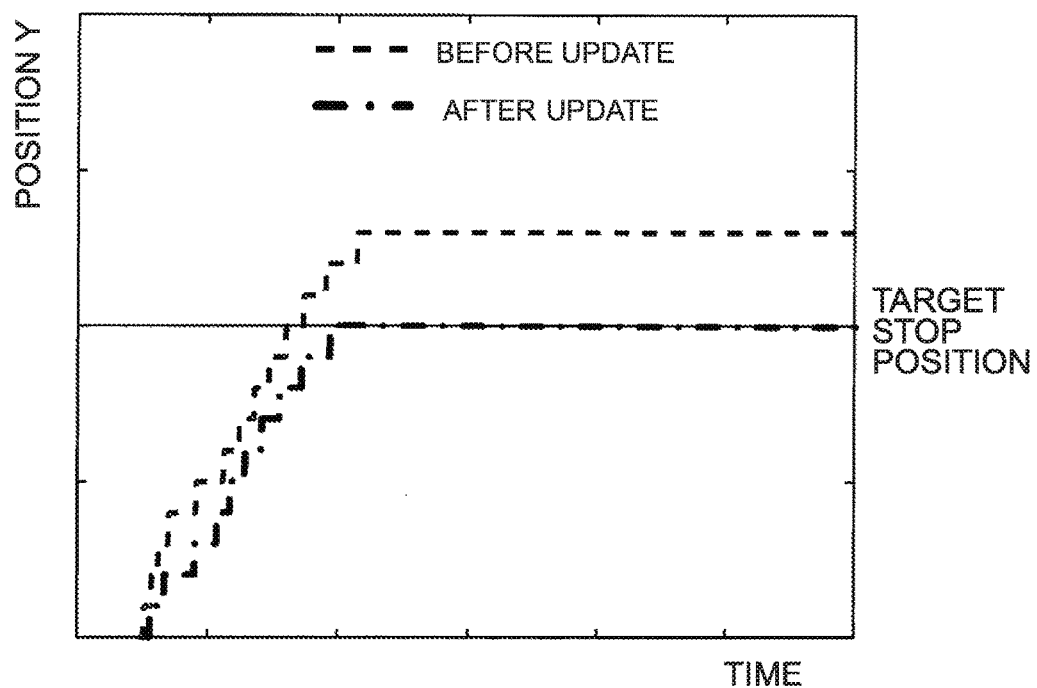
FIG. 15 is a graph indicating observation values of the control output before and after a parameter update according to a second embodiment.

Similar to FIG. 10B, FIG. 15 depicts a locus of an observation value y in the steady-state. In FIG. 15, the observation value y before the variable parameter ρ is updated by the parameter update unit 49 is depicted by a broken line, the observation value y after the variable parameter ρ is updated according to the evaluation function J2 with the parameter update unit 49 is depicted by a chain line, and the target stop position is depicted by a solid line. As understood from FIG. 15, the control accuracy by the position controller 83 is improved by the update of the variable parameter ρ according to the evaluation function J2 with the parameter update unit 49.

Figure 16:
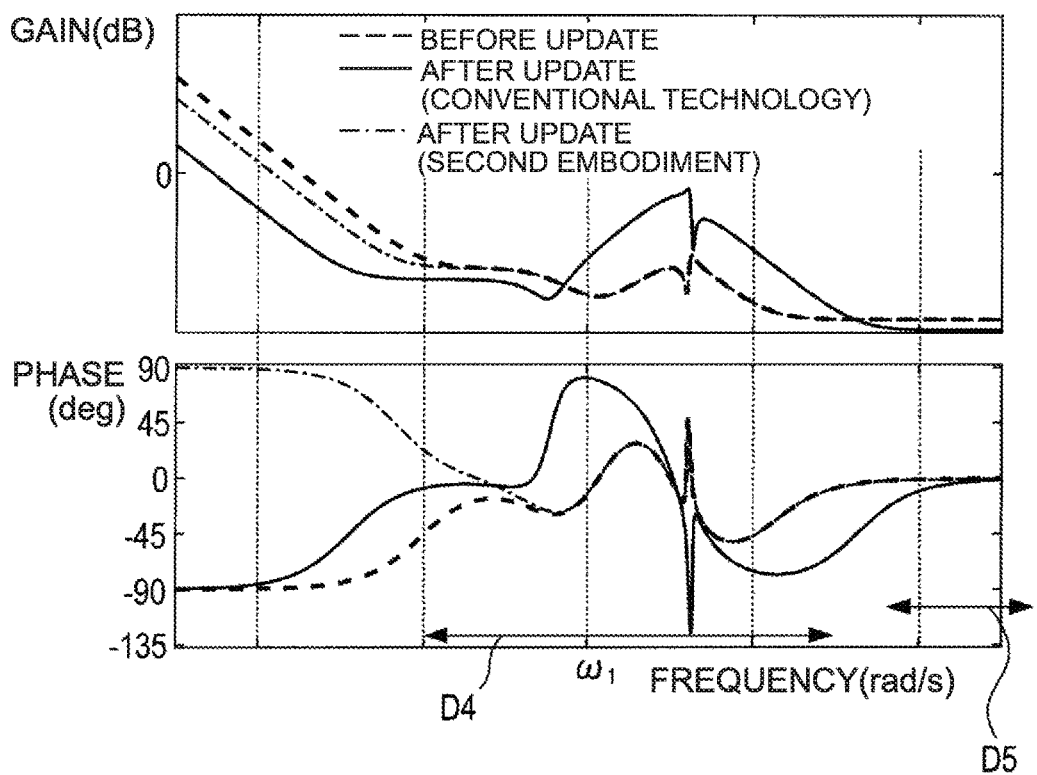
FIG. 16 is a Bode diagram indicating frequency characteristics of the transfer function before and after the parameter update according to the second embodiment.
Figure 17A:
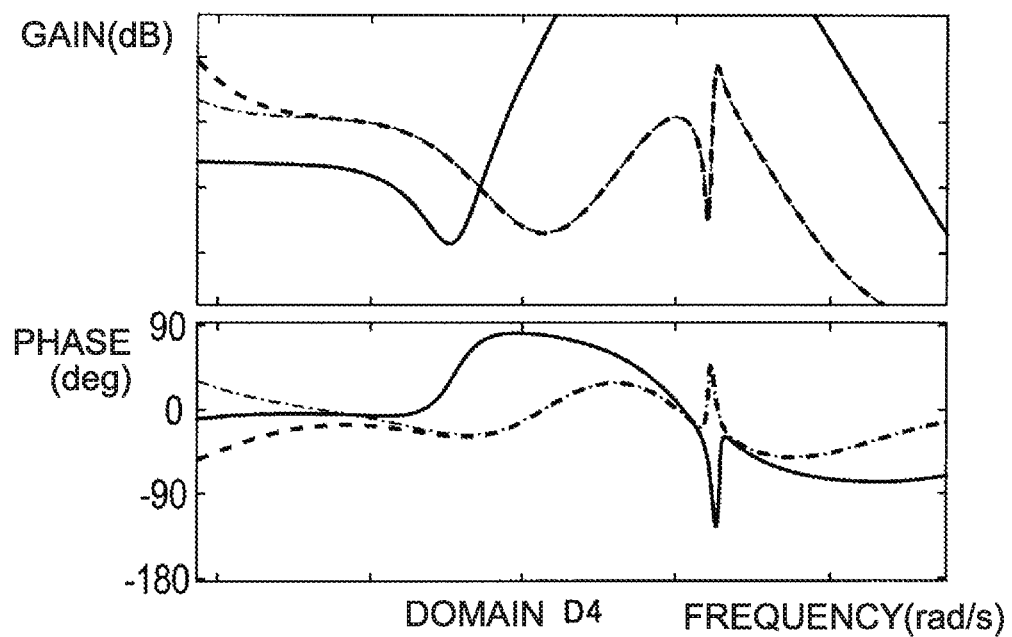
FIGS. 17A and 17B are partial enlarged Bode diagrams of FIG. 16.
Figure 17B:
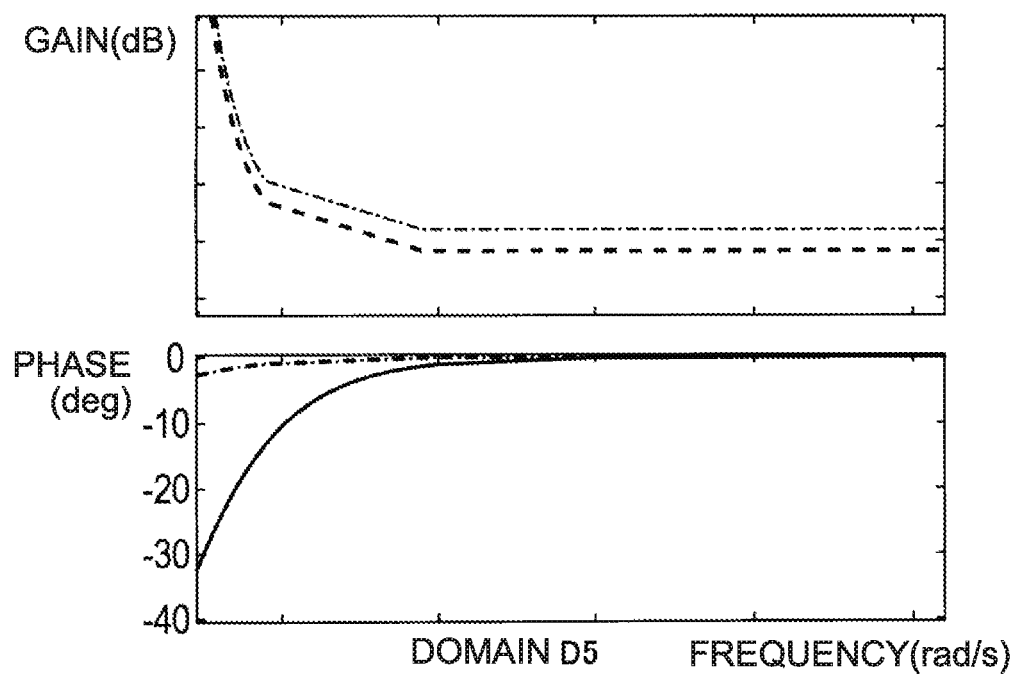

As understood from FIG. 16 and FIGS. 17A and 17B depicting enlarged parts of FIG. 16, the transfer function C(ρ) is updated so that the effect of the second member of the evaluation function J2 does not destabilize the control system. FIG. 17A is an enlarged view of the frequency domain D4 of FIG. 16, and FIG. 17B is an enlarged view of the frequency domain D5 of FIG. 16. In FIG. 16, the frequency characteristics of the position controller 83 before the variable parameter ρ is updated is depicted by a broken line, the frequency characteristics after the variable parameter ρ is updated according to the evaluation function J2 is depicted by a chain line, and the frequency characteristics after the variable parameter ρ is updated according to a conventional evaluation function is depicted by a solid line. The conventional evaluation function is a function in which the second member is removed from the evaluation function J2.

When the variable parameter ρ is updated by the conventional evaluation function, the control system is destabilized greatly. In the second embodiment, the variable parameter ρ is updated appropriately without destabilizing the control system. Thus, in the second embodiment, even when the characteristics of the control target (transfer function P) change over time, the variable parameter ρ of the position controller 83 is adjusted appropriately according to the change with the passage of time, so that the position controller 83 is updated to achieve the target response similar to the first embodiment.

In the above description, the configuration of the image forming system 1 and the configuration of the parameter update unit 49 according to each of the first and second embodiments are explained. The present disclosure, however, is not limited thereto, and may adopt various modified embodiments.

For example, the application of the parameter update unit 49 of each of the above embodiments is not limited to the control system which conveys the sheet Q intermittently. For example, the update approach of the variable parameter ρ based on each of the evaluation functions J1 and J2 can be applied to the control system of the feed unit 60 of the image forming system 1. In addition to this, the update approach of the variable parameter ρ based on each of the evaluation functions J1 and J2 can be applied to any other control system than the image forming system 1.

In the above embodiments, the functions of the parameter update unit 49 are achieved by allowing the main unit 40 to execute the programs. The present disclosure, however, is not limited thereto, and the functions of the parameter update unit 49 may be achieved by a dedicated hardware. Or, the functions of the parameter update unit 49 may be installed in an information processing unit provided independently of the control system. In that case, the information processing unit obtains an observation data of the control system and calculates an appropriate value of the variable parameter ρ.

The function provided in one component in each of the above embodiments may be distributed in components. The function provided in components may be integrated in one component. A part of the configuration according to each of the above embodiments may be omitted. At least a part of the configuration according to one of the first and second embodiments may be added to or replaced by the configuration according to the other of the first and second embodiments. The present disclosure includes various embodiments or aspects which are included in the technical ideas specified by the following claims.

What is claimed is:

1. A method of updating a setting value of a variable parameter in a controller configured to control a control target based on a control input, which is calculated according to a predetermined transfer function with the variable parameter based on a deviation between a control output and a target value of the control output, the method comprising:

obtaining time-series data of the control input and time-series data of the control output observed in control with the controller;

calculating a value of the variable parameter which minimizes an output value of an evaluation function based on the obtained time-series data of the control input and the control output; and updating the setting value of the variable parameter to the calculated value of the variable parameter, wherein the evaluation function includes a first function and a second function, the first function being a function which includes the time-series data of the control input and the control output, the predetermined transfer function with the variable parameter, and a model function indicating a reference value of the control output corresponding to the target value, and which outputs a first norm or a second norm so that the output first or second norm changes depending on the value of the variable parameter, wherein the first norm is a norm of a difference between an observation value of the control output at each time identified from the time-series data and a reference value of the control output corresponding to the value of the variable parameter, and the second norm is a norm of a difference between an observation value of the control input at each time identified from the time-series data and a reference value of the control input corresponding to the value of the variable parameter, the second function being a function in which the output value of the evaluation function corresponding to the output first or second norm increases as a change in the predetermined transfer function caused by a change in the value of the variable parameter is greater, and of which specific frequency band has an amount, by which the output value is increased, larger than that of any other frequency band.

2. The method according to claim 1, wherein the control input is a control input u satisfying a relational expression u=C(ρ)·(y−r), in the relational expression, C(ρ) represents the predetermined transfer function, ρ represents the variable parameter, y represents the control output, r represents the target value, and (y−r) represents the deviation between the control output and the target value, the evaluation function is a function J1 or a function J2 including a vectorial representation U of the time-series data of the control input and a vectorial representation Y of the time-series data of the control output, $$J1=\|Y-Y^*\|^2+\|G(\rho)\|^2$$

$$Y^*=T\cdot(C(\rho)^{-1}\cdot U+Y)$$

$$J2=\|U-U^*\|^2+\|G(\rho)\|^2$$

$$U^*=C(\rho)\cdot(T^{-1}\cdot Y-Y)$$

the first function corresponds to a first member of the function J1 or the function J2, the second function corresponds to a second member of the function J1 or the function J2, T included in the evaluation function is the model function, $G(\rho)$ is a function in which a norm $\|G(\rho)\|$ increases as a change in the predetermined transfer function $C(\rho)$ caused by a change in the value of the variable parameter ρ is greater, and of which specific frequency band has an amount, by which the norm $\|G(\rho)\|$ is increased, larger than that of any other frequency band.

3. The method according to claim 2, wherein the function G(ρ) includes an initial transfer function Cn obtained by assigning an initial value of the variable parameter ρ to the predetermined transfer function C(ρ) and the predetermined transfer function C(ρ) with the variable parameter ρ, and
in the function G(ρ), the norm increases as a ratio or difference between the predetermined transfer function C(ρ) and the initial transfer function Cn is greater.

4. A parameter update apparatus configured to update a setting value of a variable parameter in a controller configured to control a control target based on a control input, which is calculated according to a predetermined transfer function with the variable parameter based on a deviation between a control output and a target value of the control output, the apparatus comprising:
an obtaining unit configured to obtain time-series data of the control input and time-series data of the control output observed in control with the controller;
a calculation unit configured to calculate a value of the variable parameter which minimizes an output value of an evaluation function based on the time-series data of the control input and the control output obtained by the obtaining unit; and
an update unit configured to update the setting value of the variable parameter to the calculated value by the calculation unit,
wherein the evaluation function includes a first function and a second function,
the first function being a function which includes the time-series data of the control input and the control output, the predetermined transfer function with the variable parameter, and a model function indicating a reference value of the control output corresponding to the target value, and which outputs a first norm or a second norm so that the output first or second norm changes depending on the value of the variable parameter, wherein the first norm is a norm of a difference between an observation value of the control output at each time identified from the time-series data and a reference value of the control output corresponding to the value of the variable parameter, and the second norm is a norm of a difference between an observation value of the control input at each time identified from the time-series data and a reference value of the control input corresponding to the value of the variable parameter,
the second function being a function in which the output value of the evaluation function corresponding to the output first or second norm increases as a change in the predetermined transfer function caused by a change in the value of the variable parameter is greater, and of which specific frequency band has an amount, by which the output value is increased, larger than that of any other frequency band.

5. The apparatus according to claim 4, wherein the control input is a control input u satisfying a relational expression u=C(ρ)·(y−r),
in the relational expression, C(ρ) represents the predetermined transfer function, ρ represents the variable parameter, y represents the control output, r represents the target value, and (y−r) represents the deviation between the control output and the target value,
the evaluation function is a function J1 or a function J2 including a vectorial representation U of the time-series data of the control input and a vectorial representation Y of the time-series data of the control output, $J1 = \|Y - Y^*\|^2 + \|G(\rho)\|^2$ $Y^* = T \cdot (C(\rho)^{-1} \cdot U + Y)$ $J2 = \|U - U^*\|^2 + \|G(\rho)\|^2$ $U^* = C(\rho) \cdot (T^{-1} \cdot Y - Y)$ the first function part corresponds to a first member of the function J1 or the function J2, the second function part corresponds to a second member of the function J1 or the function J2, T included in the evaluation function is the model function, G(ρ) is a function in which a norm ‖G(ρ)‖ increases as a change in the predetermined transfer function C(ρ) caused by a change in the value of the variable parameter ρ is greater, and of which specific frequency band has an amount, by which the norm ‖G(ρ)‖ is increased, larger than that of any other frequency band.

6. The apparatus according to claim 5, wherein the function G(ρ) includes, as elements, an initial transfer function Cn obtained by assigning an initial value of the variable parameter ρ to the predetermined transfer function C(ρ) and the predetermined transfer function C(ρ) with the variable parameter ρ, and
in the function G(ρ), the norm increases as a ratio or difference between the predetermined transfer function C(ρ) and the initial transfer function Cn is greater.

7. A non-transitory program recording medium recording a program configured to make a computer function as the obtaining unit, the calculation unit, and the update unit in the parameter update apparatus as defined in claim 4.

* * * * *